US007810835B2

(12) United States Patent
Koch

(10) Patent No.: US 7,810,835 B2
(45) Date of Patent: Oct. 12, 2010

(54) SPORT TRAILER

(75) Inventor: John C. Koch, Frederick, MD (US)

(73) Assignee: Yakima Products, Inc., Beaverton, OR (US)

(*) Notice: Subject to any disclaimer, the term of this patent is extended or adjusted under 35 U.S.C. 154(b) by 429 days.

(21) Appl. No.: 11/897,751

(22) Filed: Aug. 31, 2007

(65) Prior Publication Data

US 2009/0026736 A1 Jan. 29, 2009

Related U.S. Application Data

(63) Continuation-in-part of application No. 29/289,679, filed on Jul. 27, 2007, now Pat. No. Des. 573,513.

(60) Provisional application No. 60/962,851, filed on Aug. 1, 2007.

(51) Int. Cl.

| | |
|---|---|
| ***B62D 63/06*** | (2006.01) |
| ***B62D 21/00*** | (2006.01) |
| ***B62D 21/03*** | (2006.01) |
| ***B60G 3/18*** | (2006.01) |
| ***B60G 15/00*** | (2006.01) |

(52) U.S. Cl. ....................... 280/656; 280/789; 280/796; 280/798; 280/790; 280/124.135; 280/124.145

(58) Field of Classification Search ................. 280/656, 280/789, 796, 798, 790, 792, 124.145, 124.148, 280/124.153, 124.135

See application file for complete search history.

(56) References Cited

U.S. PATENT DOCUMENTS

| | | | | |
|---|---|---|---|---|
| 341,690 A | | 5/1886 | Reichenbach | |
| 639,991 A | | 12/1899 | Jewell | |
| 2,174,063 A | * | 9/1939 | Richards | 280/482 |
| 2,456,013 A | | 12/1948 | Witt | |
| 2,468,914 A | | 5/1949 | Banaszak et al. | |
| 2,469,506 A | | 5/1949 | Kerr et al. | |
| 2,879,072 A | | 3/1959 | Rear et al. | |
| 3,025,985 A | | 3/1962 | Crawford | |
| 3,031,180 A | | 4/1962 | Sergay | |
| 3,367,675 A | | 2/1968 | Gearin | |
| 3,451,690 A | | 6/1969 | Cravens | |
| 3,507,580 A | * | 4/1970 | Howard et al. | 417/231 |
| 3,781,030 A | | 12/1973 | Ekedal | |
| 3,885,146 A | | 5/1975 | Whitley, Jr. | |
| 3,941,406 A | | 3/1976 | Eggleston | |
| 3,966,223 A | | 6/1976 | Carr | |

(Continued)

*Primary Examiner*—S. Joseph Morano
*Assistant Examiner*—John R Olszewski
(74) *Attorney, Agent, or Firm*—Kolisch Hartwell, PC

(57) ABSTRACT

A sport trailer including a center load supporting rail, wheels, mounting assemblies for the wheels, and a stowable towing tongue, the wheel mounting assemblies include a shock absorber connected to each wheel and to a bifurcated strut that extends outward from the center rail. Upper and lower dual swing arms pivot and extend from the center rail to a mounting bracket attached to the wheels. The upper swing arms are shorter than the lower swing arms to achieve negative camber. The towing tongue is removably received within an inner channel of the center rail and telescopes relative to the center rail to achieve different length configurations of the trailer. A rear tongue is removably received within the center rail inner channel at the back end of the trailer. The rear tongue telescopes relative to the center rail and includes a taillight assembly.

5 Claims, 6 Drawing Sheets

U.S. PATENT DOCUMENTS

| | | | | |
|---|---|---|---|---|
| 4,180,280 | A | 12/1979 | Doveri | |
| 4,230,340 | A | 10/1980 | Wasservogel | |
| 4,239,258 | A * | 12/1980 | Burris | 280/639 |
| 4,344,643 | A | 8/1982 | Ray | |
| 4,415,181 | A | 11/1983 | McCall et al. | |
| 4,442,961 | A | 4/1984 | Bott | |
| 4,453,735 | A | 6/1984 | Penverne et al. | |
| 4,480,851 | A | 11/1984 | St-Pierre | |
| 4,746,142 | A | 5/1988 | Davis | |
| 4,765,642 | A | 8/1988 | Struzina | |
| 4,768,806 | A | 9/1988 | Tetreault | |
| 4,786,073 | A | 11/1988 | Harper | |
| 4,800,471 | A * | 1/1989 | Lippert | 362/485 |
| 4,995,129 | A | 2/1991 | Comardo | |
| 5,137,297 | A | 8/1992 | Walker | |
| 5,249,823 | A | 10/1993 | McCoy et al. | |
| 5,265,897 | A | 11/1993 | Stephens | |
| 5,340,134 | A | 8/1994 | Dodson | |
| 5,364,081 | A | 11/1994 | Hartl | |
| 5,368,325 | A * | 11/1994 | Hazen | 280/656 |
| 5,397,148 | A | 3/1995 | Nelson | |
| 5,549,231 | A | 8/1996 | Fletcher et al. | |
| 5,673,928 | A | 10/1997 | Jury | |
| 5,924,836 | A | 7/1999 | Kelly | |
| 5,941,542 | A | 8/1999 | Kalman | |
| 6,164,683 | A | 12/2000 | Kalman | |
| 6,199,909 | B1 | 3/2001 | Kass et al. | |
| 6,283,496 | B1 | 9/2001 | Dickmann | |
| 6,585,285 | B2 | 7/2003 | Koch | |
| 6,623,028 | B1 * | 9/2003 | Johnston | 280/656 |
| 6,695,329 | B2 * | 2/2004 | Handa | 280/124.135 |
| 6,951,346 | B2 | 10/2005 | Brackett et al. | |
| 7,073,816 | B1 * | 7/2006 | Larson et al. | 280/656 |
| 7,591,337 | B2 * | 9/2009 | Suhre et al. | 180/210 |
| 2001/0045720 | A1 * | 11/2001 | Schlicht | 280/166 |
| 2002/0079669 | A1 * | 6/2002 | Hagen et al. | 280/164.1 |
| 2005/0110264 | A1 * | 5/2005 | Seki et al. | 280/788 |
| 2007/0246911 | A1 * | 10/2007 | Shawyer | 280/414.1 |

* cited by examiner

SPORT TRAILER

CROSS-REFERENCE TO RELATED APPLICATIONS

This application claims the benefit of U.S. Provisional Application No. 60/962,851 filed Aug. 1, 2007 and incorporated by reference herein. This application also is a Continuation-in-Part of U.S. Design Application No. 29/289,679, filed Jul. 27, 2007 and incorporated by reference herein.

BACKGROUND OF THE INVENTION

The present invention is directed to a sport trailer for transporting loads, particularly sporting equipment such as kayaks, canoes, and the like. Sporting equipment for many outdoor activities will not fit into users' vehicles. Furthermore, the equipment can be heavy and cumbersome to load onto a roof carrier or rack.

Utility trailers for carrying sports equipment have been developed to facilitate transportation. Sports enthusiasts and other users desire a trailer that is adaptable to different types of sports equipment and is relatively lightweight. The ability to adjust the length of a trailer to accommodate different loads is also desired. It is preferable that the versatility of a trailer be improved by making the length adjustable at the front end or the rear, or both.

Many users are not experienced in the use of trailers and prefer a trailer that has superior handling characteristics. There is a need for a trailer's suspension system to be relatively simple because a typical user is not experienced in hauling a trailer. In accordance with the present invention, it is desirable that the trailer's suspension system be configured to provide superior handling characteristics in a simple and durable design.

SUMMARY OF THE INVENTION

The present invention provides a sport trailer that is versatile and has superior handling characteristics. The trailer includes a load supporting center rail that receives a stowable towing tongue at the front and a second tongue at the rear. Load supporting assemblies are attached along the center rail and extend above the center rail for receiving and carrying a load. The center rail is connected to a pair of ground traversing wheels by a wheel mounting assembly, which includes a double-arm suspension system and a shock absorber assembly that connects to the center rail by a bifurcated strut.

The telescopically stowable towing tongue and the rear tongue are each received in a tongue receiver and held therein by a locking pin that is removable to allow telescoping of the tongues from the center rail for storage and load adjustment. The tongues are provided with multiple pass-through bores along their lengths whereby the tongues may be telescoped in and out of the center rail to vary the overall length of the trailer. The tongue receiver fits on either end of the center rail and is made of plastic or the like to facilitate sliding of the tongues relative to the center rail. Each tongue is provided with an inner tongue slide, also made of plastic or the like, that fits on the respective end of the tongue that is received by the center rail. The inner tongue slides facilitate sliding of the tongues within the center rail.

Two load supporting assemblies are attached along the center rail and include load bars that extend laterally from the center rail. The position of the load supporting assemblies may be moved along the length of the center rail, or one of the load supporting assemblies may be attached to the removable towing tongue or to the rear tongue to accommodate loads of varying lengths.

Each wheel mounting assembly includes a mounting bracket that attaches to the hub of each wheel. Dual upper swing arms extend outward from a pivot rod that is attached to the center rail to the mounting bracket. The pivot rod is attached to an outer sleeve assembly that slides over the center rail and can be anchored at various positions to adjust the weight and balance dynamics of the trailer and/or load to optimize safety and performance. The upper swing arms are spaced apart along the rod and abut each other at the mounting bracket to form a triangular shape for greater stability. The swing arms are rotatably attached to the upper rod and to the mounting bracket to allow vertical movement of the wheels relative to the center rail. Dual lower swing arms are similarly configured, but the lower rod attaches toward the bottom of the center rail. The dual lower swing arms attach to the mounting bracket at a position below the dual upper swing arms.

The upper swing arms are shorter than the lower swing arms, which produces negative camber during turns for better handling of the trailer.

The shock absorber attaches to the lower swing arms at a position near the mounting bracket and extends upward to a bifurcated strut. The strut has two arms, one of which is pivotally attached to the upper rod that holds the upper swing arms and the other of which is pivotally attached to the lower rod that holds the lower swing arms. Once installed the shock strut is fixed in position relative to the center rail. However, it is foreseen that different lengths of struts may be used to adjust the position of the shock absorber to create different suspension to shock absorber "leverage ratios" depending on the load and performance parameters desired. It is also foreseen that the angle of the shock absorber relative to vertical may also be configured to adjust the "progression ratio" of the shock absorber's spring rate as a function of wheel travel. It is further foreseen that the strut can provide a negative, neutral or positive progression ratio as desired for various performance dynamics by changing the strut length. A negative progression ration is defined herein as a shock absorber spring rate that decreases as a function of upward wheel travel. This rate may be non linear and may even occur after the "cross-over" point wherein a dual spring shock absorber's spring rate increases when the smaller spring reaches "coil-bind" or full compression. A positive progression rate is when the effective spring rate increases with upward wheel movement. This automatically occurs with a dual-spring shock when the small spring is fully compressed. A neutral progression ration means the spring rate is constant throughout the wheel travel. The upper arm of the strut extends horizontally from the center rail and the lower arm of the strut extends outward and upward from the lower rod to the outer end of the strut. The shock absorber attached to the strut at the outer end, which is positioned to maintain the shock absorber in a desired position relative to the wheel.

The rear tongue has a light assembly at its tail end, including a transverse bracket or wing and a taillight at each outer end of the bracket. The rear tongue may be telescoped relative to the center rail to achieve a desired configuration of the sport trailer. The transverse bracket may also function as a load supporting or tie down bar as desired for longer loads such as long kayaks. This is to prevent load from "see-sawing" or oscillating relative to the wheel axle, which is a common problem when mounting long boats on single axle trailers where long and otherwise unsecured boat overhangs are unavoidable.

OBJECTS AND ADVANTAGES OF THE INVENTION

Therefore, the objects of the present invention are: to provide a sport trailer that can accommodate loads of varying lengths; to provide such a trailer with a telescopically stowable towing tongue that can be telescoped within a center rail to vary the length of the trailer; to provide such a trailer that has a rear tongue that can also be telescoped within a center rail to vary the length of the trailer; to provide such a trailer that includes a tongue receiver and inner tongue slide to facilitate telescoping of the stowable towing tongue and rear tongue; to provide such a trailer with front and rear load supporting assemblies for carrying a load; to provide such a trailer that has one or more wheel mounting assemblies with upper and lower dual swing arms rotatably attached to the center rail and a mounting bracket attached to a wheel hub; to provide such a trailer in which the upper and lower swing arms are configured to achieve negative camber to improve handling of the trailer during travel; to provide such a trailer in which the negative camber is achieved by making the upper swing arms shorter than the lower swing arms; to provide such a trailer with upper and lower swing arms configured to form a triangular shape between the center rail and the mounting bracket; to provide such a trailer with a shock absorber connected to the center rail by a strut for improved positioning of the shock absorber; to provide such a trailer having a strut connected to the center rail, wherein the strut has an upper arm attached along the upper surface of the center rail and extending horizontally outward therefrom and a lower arm attached along the lower surface of the center rail and extending upward to meet the upper arm to form a triangular structure to receive the upper end of the shock absorber; to provide such a trailer that is relatively easy to manufacture and inexpensive to produce; and to provide such a trailer that is particularly well adapted for the intended usages thereof.

Other objects and advantages of this invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

Figure 1:
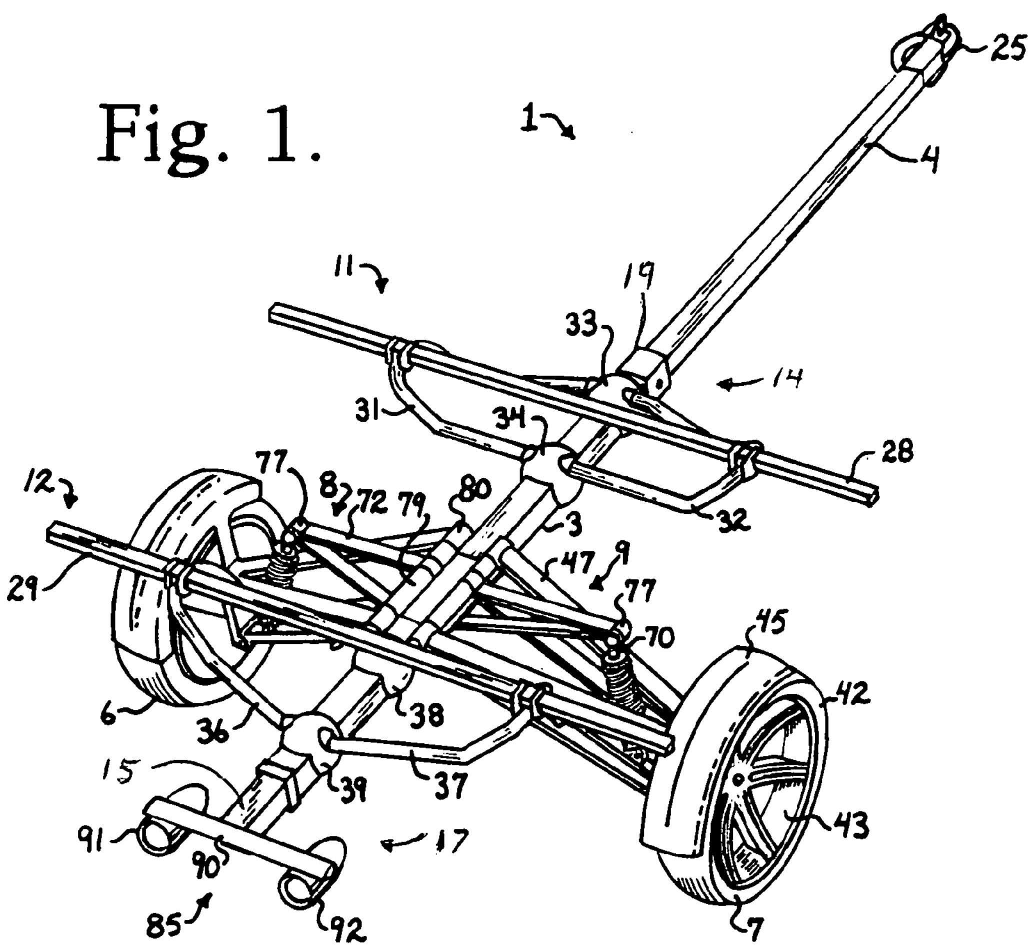
FIG. 1 is a perspective view of a sport trailer in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally illustrates a trailer in accordance with the present invention having a load supporting center rail 3, a telescopically stowable or removable towing tongue 4, a pair of wheels 6 and 7, a pair of wheel mounting assemblies 8 and 9, a front load supporting assembly 11, and a rear load supporting assembly 12. The center rail 3 receives the towing tongue 4 at its forward end 14 and an extendable rear tongue 15 at its distal end 17. While the present embodiment shows only a pair of wheels 6 and 7 on each wheel mounting assembly 8 and 9, it is foreseen that more than one pair may be on each assembly. Further, while the embodiment shows only a pair of wheel mounting assemblies, it is foreseen that more such assemblies may be utilized in some embodiments.

Located at the forward end 14 of the center rail 3 is a tongue receiver 19. The tongue receiver 19 is open at the front end thereof and sized and shaped to snugly, but slidably, receive the tongue 4. The tongue 4 is an elongate rectangular, preferably generally square, tubular member with an interior channel 22 extending its entire axial length. It is foreseen that other cross sectional shapes such as oval could be used for the center rail and tongues. Similarly, the center rail 3 is an elongate tubular member with an interior channel 24 extending its entire axial length and sized and shaped to slidably receive the tongue 4. The tongue 4 includes a conventional ball-type coupler 25 for joining with a ball (not shown) of a towing vehicle (not shown). It is foreseen that other types of couplers may be utilized with the invention, including custom couplers designed to improve performance and/or aesthetics.

Figure 2:
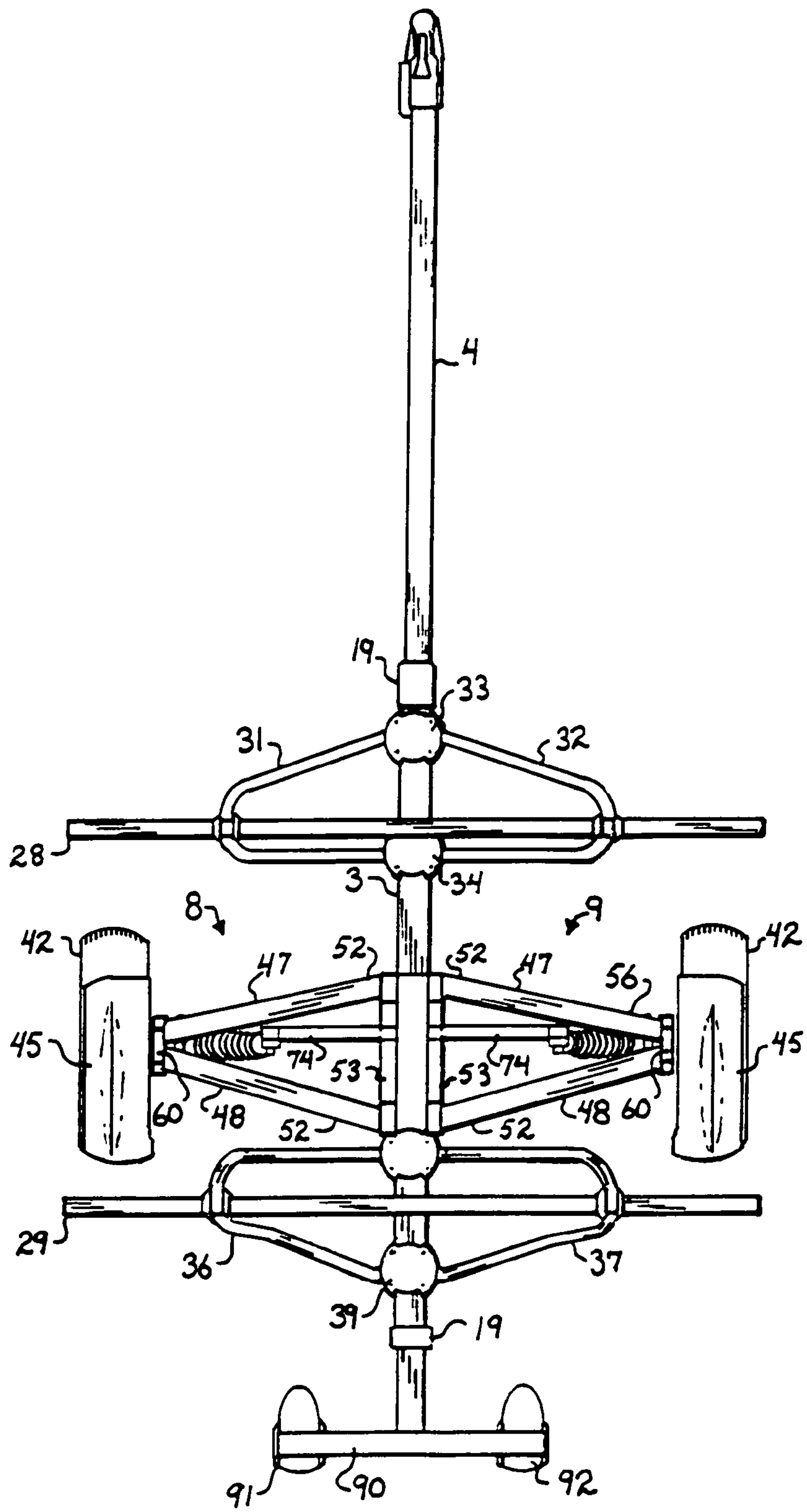
FIG. 2 is a top view of the sport trailer.
Figure 3:
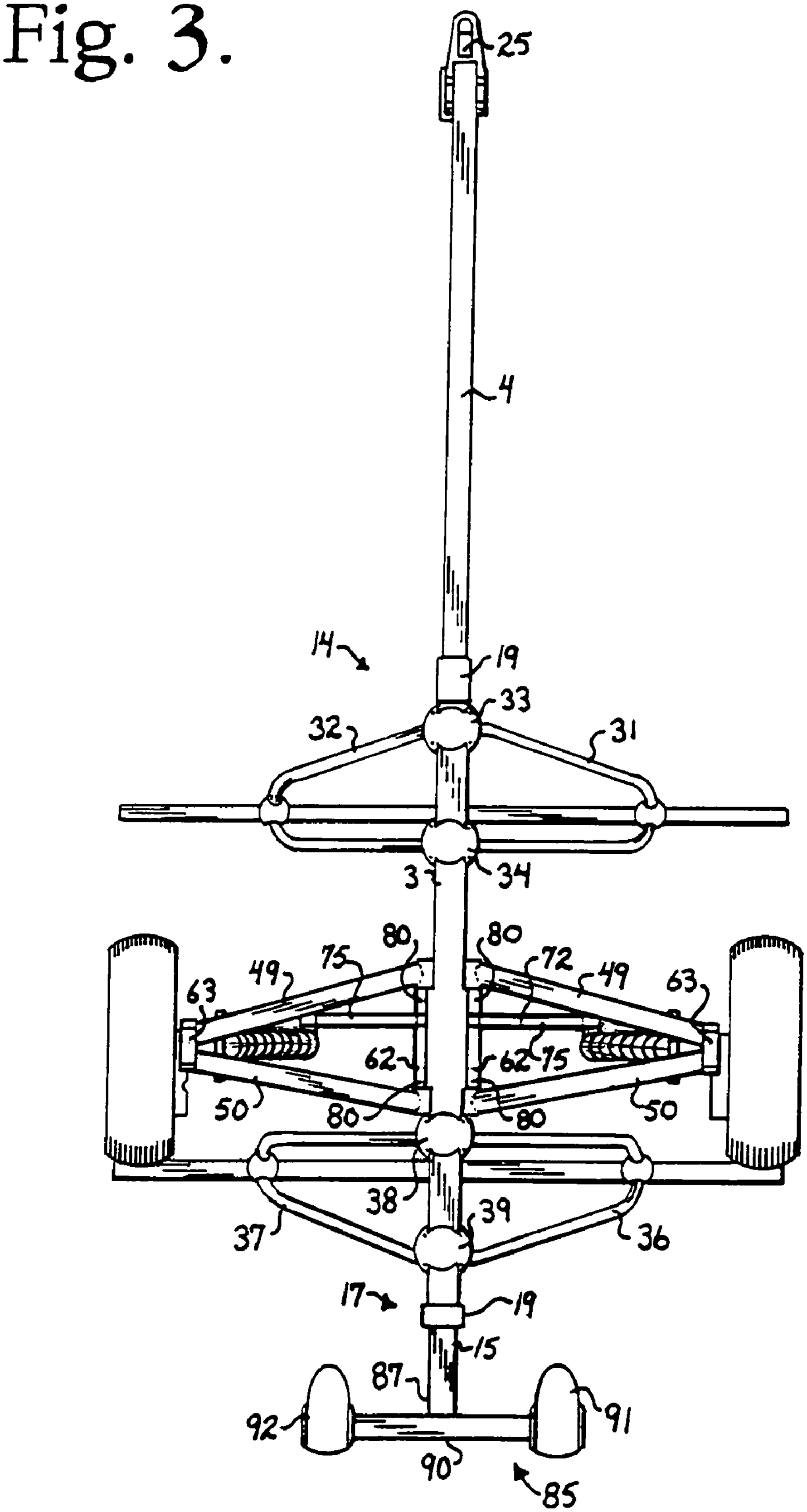
FIG. 3 is a bottom view of the sport trailer.

The front and rear load supporting assemblies 11 and 12 are mounted along the load supporting center rail 3 and extend laterally and generally extend laterally and generally perpendicular thereto. Each load supporting assembly 11 and 12 has a load bar 28 and 29, respectively, that is positioned perpendicular to the center rail 3. The front load bar 28 is attached to the center rail 3 by dual support frames 31 and 32, which extend outward and upward from the center rail 3 to support the front load bar 28. The support frames 31 and 32 are removably attached to the center rail 3 by wing clamps 33 and 34. The support frames 31 and 32 are tubular and extend upward from center rail 3 to position the front load bar 28 for receiving a load. The support frames 31 and 32 are bowed or bent, as illustrated in FIG. 2, such that front load bar 28 is positioned between wing clamps 33 and 34 for stability. The front load bar 28 is shown attached to the load supporting center rail 3, but may alternatively be attached to the tongue 4 when appropriate to support a load that is longer than typical.

The rear load bar 29 is attached to the center rail 3 by dual support frames 36 and 37, which extend outward and upward from the center rail 3 to support the rear load bar 29. The support frames 36 and 37 are removably attached to the center rail 3 by wing clamps 38 and 39. The support frames 36 and 37 are tubular and extend upward from the center rail 3 to position the rear load bar 29 for receiving a load, such as a kayak (not shown). The support frames 36 and 37 are bent, as illustrated in FIG. 2, such that the rear load bar 29 is positioned between the wing clamps 38 and 39 for stability. The rear load bar 29 is shown attached to the load supporting center rail 3, but may alternatively be attached to the rear tongue 15 when appropriate to support a load that is longer than typical. The wing clamps 33 and 34 for supporting assembly 11 and 38 and 39 for supporting assembly 12 are selectively releasable by a user to allow the user to reposition the supporting assemblies 11 and 12 forward or rearward relative to the center rail to optimize weight and balance load to optimize safety and performance. It is foreseen that additional load supporting assemblies may be added as required for the weight and/or length of the load.

Figure 4:
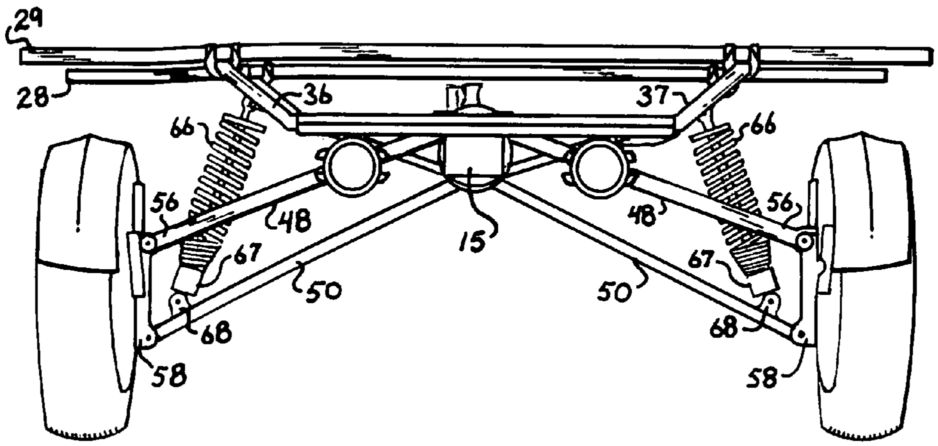
FIG. 4 is rear view of the sport trailer.
Figure 5:
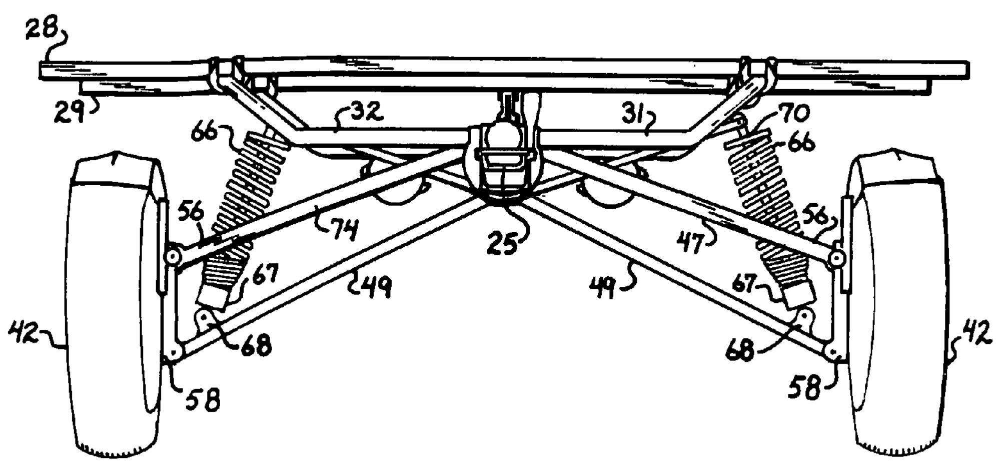
FIG. 5 is a front view of the sport trailer.
Figure 6:
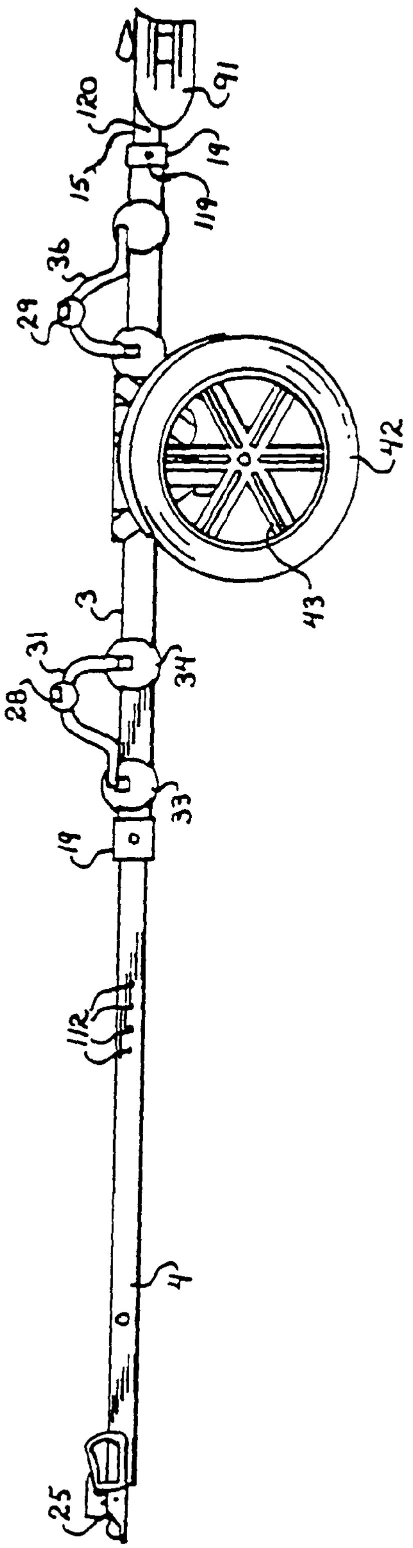
FIG. 6 is a left side elevation view of the sport trailer.
Figure 7:
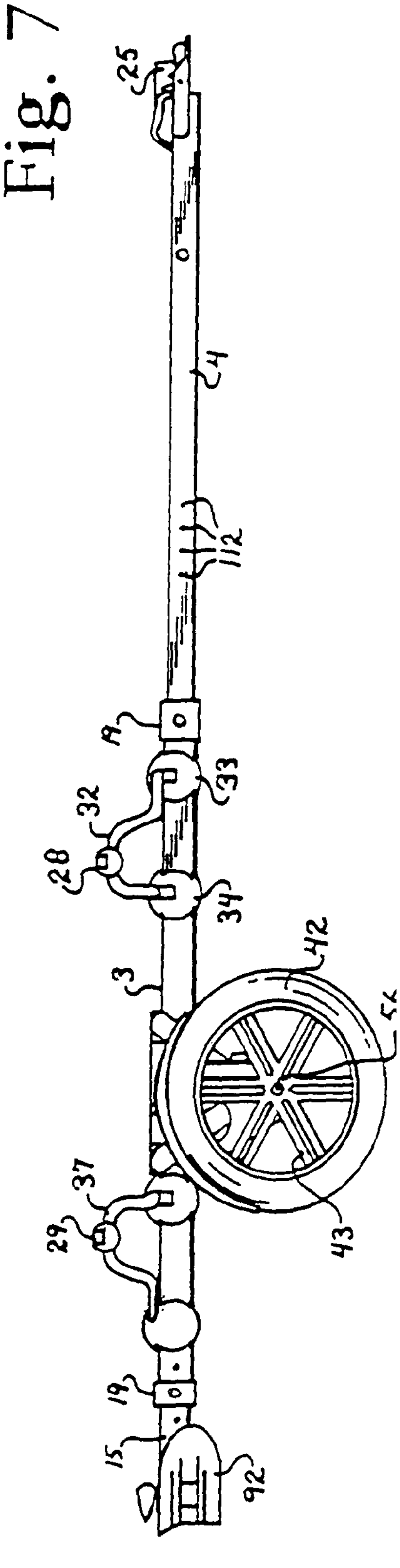
FIG. 7 is a right side elevation view of the sport trailer.

Each of the wheels 6 and 7 has a ground-traversing tire 42 and a hub 43 that attaches to the wheel mounting assemblies 8 and 9, respectively. As shown, each of the wheel mounting assembly 8 and 9 includes a fender 45 for the wheels 6 and 7. Each of the wheel mounting assemblies 8 and 9 has dual upper swing arms 47 and 48 and dual lower swing arms 49 and 50 for mounting the wheels 6 and 7 to the trailer 1, as illustrated in FIGS. 4 and 5.

A central end 52 of each upper swing arm 47 and 48 mounts to an upper rod 53 that is attached longitudinally along the center rail 3. Each central end 52 is fabricated with a bore (not shown) that receives the upper rod 53 to allow pivotal movement of the upper swing arms 47 and 48 relative to the center rail 3. An outer end 56 of each of the upper swing arm 47 and 48 mounts to a mounting bracket 58 that is attached to wheel hub 43, as shown in FIGS. 4 and 5. The outer end 56 of each upper swing arm 47 and 48 has a bore (not shown) through which a bracket pin 60 passes to mount the upper swing arms 47 and 48 to the mounting bracket 58 while allowing pivotal movement thereof.

The upper rod 53 is substantially longer than bracket pin 60 such that the upper swing arms 47 and 48 are spaced apart along the upper rod 53 and abut each other along the bracket pin 60, forming a triangular shape, as illustrated in FIG. 2. The lower swing arms 49 and 50 are configured similarly to the upper swing arms 47 and 48. The lower swing arms 49 and 50 are connected to the center rail 3 by a lower rod 62 for pivotal movement of the lower swing arms 49 and 50 relative to the center rail 3. The lower swing arms are connected to the mounting bracket 58 by a lower bracket pin 63. As with the upper swing arms 47 and 48, the lower swing arms 49 and 50 form a triangular shape with lower rod 62.

The upper swing arms 47 and 48 are fabricated to be shorter than the lower swing arms 49 and 50 such that the swing radius of the upper swing arms 47 and 48 is shorter than that of the lower swing arms 49 and 50. As an associated wheel 6 or 7 travels up during cornering, the shorter swing radius of the upper swing arms 47 and 48 produces a negative camber of the wheel 6 or 7, thereby improving the handling characteristics of the trailer 1.

Each of the wheel mounting assembly 8 and 9 includes a shock absorber 66 that is mounted between the center rail 3 and the wheels 6 and 7 (FIGS. 4 and 5). Each of the shock absorber 66 is rotatably attached at the lower end 67 to a rod 68 attached to and extending between the lower swing arms 49 and 50. The upper end 70 of each shock absorber 66 is rotatably attached to a bifurcated strut 72 extending outward from the center rail 3. The bifurcated strut includes an upper arm 74 that generally extends horizontally from the upper rod 53 and a lower arm 75 that extends upward from the lower rod 62. The upper arm 74 and lower arm 75 join at an outer end 77. The strut 72 is fabricated such that the lower arm 75 is longer than the upper arm 74 in order to position the upper arm in a horizontal position. The upper end 70 of shock absorber 66 is rotatably attached to the outer end 77 of the bifurcated strut 72, thereby positioning the shock absorber 66 in an operational position angled inward from the wheels 6 and 7 and outward from the center rail 3.

The position of the bifurcated strut 72 along the upper rod 53 and the lower rod 62 is maintained by the placement of spacing the sleeves 79 and 80 along the upper rod 53 and the lower rod 62.

The rear tongue 15 includes a light assembly 85 that is attached to the outward end 87 of the rear tongue 15. The light assembly includes a load supporting and tie-down mounting bar 90 that is attached to the outward end 87 and aligned perpendicular to the rear tongue 15. Taillights 91 and 92 are attached to the mounting bar 90 and spaced therealong in a manner that complies with applicable trailer standards. Appropriate wiring (not shown) runs through the interior channels of the towing tongue 4, the center rail 3, and the rear tongue 15 from the forward end of the removable towing tongue 4 to the taillights 91 and 92.

Figure 8:
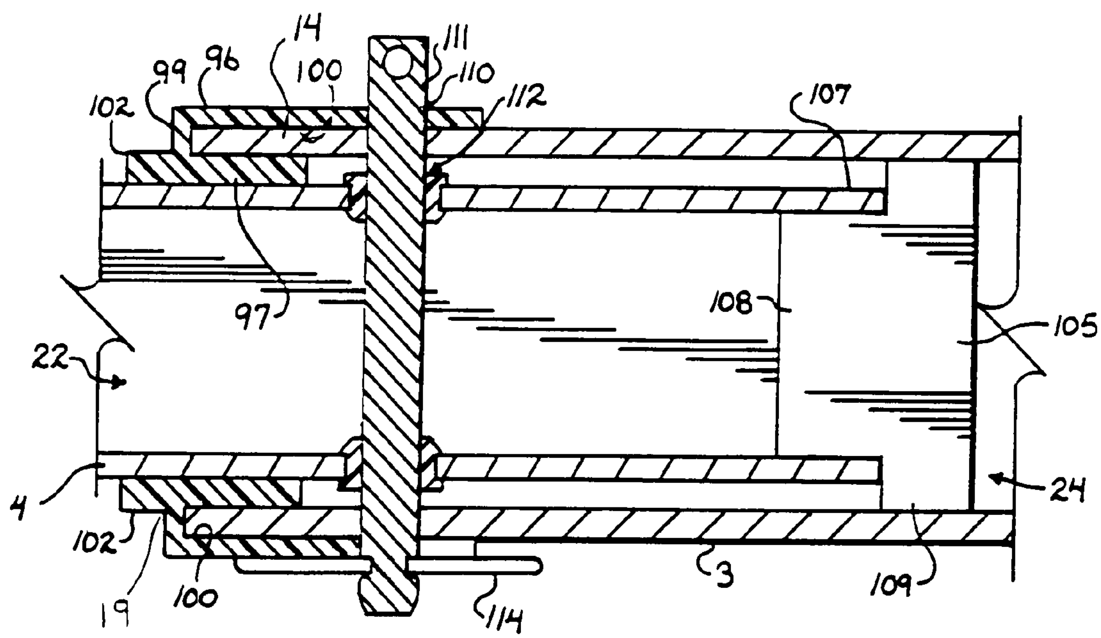
FIG. 8 is an enlarged, fragmentary side view of a portion of the trailer showing a center rail receiving a towing tongue.

As shown in FIG. 8, the tongue receiver 19 is fabricated to fit on the forward end 14 of center rail 3 and to receive the tongue 4. The tongue receiver 19 is formed with an outer wall 96 and an inner wall 97 connected by an end wall 99. A channel 100 is formed between the outer wall 96 and the inner wall 97, into which the forward end 14 of the center rail 3 is received. A flange 102 is formed at the outer end of the tongue receiver 19. An inner tongue slide 105 fits into the distal end 107 of the tongue 4 to facilitate sliding of the tongue 4 within the center rail 3. The tongue slide 105 has a center core 108 sized to fit snugly into the interior channel 22 of the tongue 4. An outer flange 109 extends from the center core 108 and is sized to fit snugly into the interior channel 24 of the center rail 3. It is envisioned that the tongue receiver 19 and inner tongue slide 105 are fabricated from a plastic material that will facilitate sliding of the tongue 4 with respect to the center rail 3.

The tongue receiver 19 includes a pass-through side to side bore 110, which operably receives tongue-locking pin 111. The tongue receiver 19, center rail 3 and tongues 4 and 15 form and have an intersecting axial passageway therethrough extending the entire length of the trailer 1 to receive a wiring harness (not shown) for tail lights and the like. The tongue 4 has a plurality of passage structures or pass-through bores 112 spaced therealong at selected locations for varying placement of the tongue 4 within the center frame 3. The pass-through bore 110 in the tongue receiver 19 aligns with the corresponding pass-through bores 112 in the tongue 4. The pin 111 is manually insertable through and removable from properly aligned pass-through bores 110 and 112 for converting between configurations. The tongue-locking pin 111 includes a keeper 114 for securing the pin 109 in place. It is foreseen that a spring release pin that may be pushed in or pulled out to release the tongue 4, or a locking cam, or a similar locking device may also be employed as a non-removable device for allowing selective locking and release.

The rear tongue 15 may be telescoped with respect to the distal end 17 of the center rail 3 in the same manner that the removable towing tongue 4 may be telescoped with respect to the forward end 14 of the center rail 3. This is accomplished by fitting the inner end (not shown) of the rear tongue 15 with an inner tongue slide (not shown) that facilitates telescoping of the rear tongue 15 with respect to the center rail 3. Similarly, the distal end 17 is fitted with a tongue slide 105, also to facilitate the telescoping process. The rear tongue 15 is held in place by an appropriate pin 119 and keeper (not shown), as described above for tongue 4. A series of passage structures or pass-through bores 120 are spaced along the length of the rear tongue 15 to receive the pin to secure the rear tongue 15 in various telescoped configurations.

It is foreseen that one or more additional center rails with associated load supporting assemblies and wheel-mounting assemblies could be connected a trailer by use of a suitably adapted connector tongue (not shown). Such a connector tongue would include pass-through bores at each end for being received in the distal end 17 of center rail 3 and in the forward end 14 of an additional center rail. In this manner, the assemblies may be ganged in tandem to provide for long term rowing skiffs or the like.

It is foreseen that additional wheel assemblies and/or mounting assemblies may be installed on a single center rail or that the center rail may be provided in a longer length and stronger construction according to required load lengths and weights.

It is to be understood that while certain forms of the present invention have been illustrated and described herein, it is not to be limited to the specific forms or arrangement of parts described and shown.

What is claimed and desired to be secured by Letters Patent is as follows:

1. A sport trailer adapted for transporting equipment comprising:

a) a center rail adapted to support equipment;

b) a load supporting assembly;

c) a pair of ground traversing wheels each including a wheel hub;

d) a pair of wheel mounting assemblies; each of said mounting assemblies operably joining a respective wheel to said center rail;

each of said mounting assemblies including:

1) a shock absorber assembly pivotally connected to said center rail and to said wheel hub;

2) a mounting bracket attached to a respective wheel hub;

3) a pair of opposed upper swing arms pivotally mounted at a first end thereof at an upper position on said center rail and having a second end;

4) said second end of said upper swing arms being pivotally attached to said mounting bracket at an upper position thereon;

5) a pair of opposed lower swing arms pivotally mounted at a first end thereof at a lower position on said center rail and having a second end; and 6) said second end of said lower swing arms being pivotally attached to said mounting bracket at a lower position thereon, wherein each said shock absorber assembly includes:

a) a strut mounted to said center rail and extending outward toward a respective wheel;

b) an upper end of said shock absorber being pivotally mounted to an outer end of said strut; and c) a lower end of said shock absorber being pivotally mounted to a mounting rod extending between said lower swing arms near said mounting bracket, and wherein each said strut includes:

a) an upper arm connected to an upper portion of said center rail and extending outward generally horizontally from said center rail; and b) a lower arm connected to a lower portion of said center rail and extending outward and upward to said outer end of said strut.

2. The trailer according to claim 1 wherein said upper swing arms are shorter than the lower swing arms.

3. The trailer according to claim 2 wherein said first ends of said upper swing arms and said lower swing arms are spaced apart along said center rail and said second ends of said upper swing arms and said lower swing arms abut each other, thereby forming triangular structures.

4. A sport trailer adapted for transporting equipment comprising:

a) a center rail adapted to support equipment;

b) a load supporting assembly;

c) a pair of ground traversing wheels;

d) a pair of wheel mounting assemblies; each of said mounting assemblies operably joining a respective wheel to said center rail;

e) an elongate towing tongue being telescopically stowably received within an interior channel of said center rail;

f) passage structure located on said center rail;

g) a plurality of passage structures located along said towing tongue and sized to allow the passage of a removable pin through said center rail passage structure and a selected towing tongue passage structure, whereby said towing tongue may be telescoped relative to said center rail;

h) a tongue receiver that is removably connected to a forward end of said center rail and said tongue receiver being sized to snugly receive a distal end of said towing tongue so as to facilitate the receipt of said towing tongue in said interior channel of said center rail; and i) an inner tongue slide that is removably connected to said distal end of said towing tongue and sized to be snugly received in said interior channel of said center rail to facilitate sliding of said towing tongue within said interior channel.

5. The trailer according to claim 4 including:

a) a rear tongue being telescopically stowably received within said interior channel at a distal end of said center rail and supporting rear lights;

b) passage structure located on said center rail at said distal end thereof; and c) a plurality of passage structures located along said rear tongue and sized to allow the passage of a removable pin through said center rail passage structure located at the distal end of the center rail and a selected rear tongue passage structure, whereby said rear tongue may be telescoped relative to said center rail to adjust the position of the rear lights of the trailer relative to a load carried by the trailer.

* * * * *